United States Patent [19]

Joseph

[11] Patent Number: 4,685,556
[45] Date of Patent: Aug. 11, 1987

[54] DRIVE MECHANISM FOR A LIVE ROLLER CONVEYOR

[75] Inventor: Louis H. Joseph, Watertown, Wis.

[73] Assignee: Dorner Mfg. Corp., Hartland, Wis.

[21] Appl. No.: 794,483

[22] Filed: Nov. 4, 1985

[51] Int. Cl.$^4$ ............................................. B65G 13/08
[52] U.S. Cl. ...................................... 198/787; 198/789
[58] Field of Search ................. 198/787, 789, 790, 791

[56] References Cited

U.S. PATENT DOCUMENTS

| | | | |
|---|---|---|---|
| 871,340 | 11/1907 | Hedina. | |
| 1,975,927 | 10/1934 | Cushman | 198/127 |
| 3,369,646 | 2/1968 | Musser | 198/787 |
| 4,103,769 | 8/1978 | Jorgensen | 198/781 |
| 4,485,913 | 12/1984 | Treiber | 198/790 |
| 4,572,447 | 2/1986 | Raasch | 198/787 |

FOREIGN PATENT DOCUMENTS 1518326 3/1968 France.
477144 12/1937 United Kingdom.

*Primary Examiner*—Joseph E. Valenza
*Attorney, Agent, or Firm*—Andrus, Sceales, Starke & Sawall

[57] ABSTRACT

A live roller conveyor includes a plurality of rollers arranged in a curved path with the axes of the rollers being located at an acute angle with respect to each other. A rotatable drive disc is located above the adjacent inner ends of the rollers, and an O-ring is mounted in a groove formed in the lower surface of the drive disc and engages the inner ends of the rollers. Rotation of the drive disc will be transmitted through the O-ring to the rollers to rotate the rollers about their axes. The vertical position of the drive disc relative to the rollers can be adjusted to provide precise control of the frictional engagement between the O-ring and the rollers.

9 Claims, 3 Drawing Figures

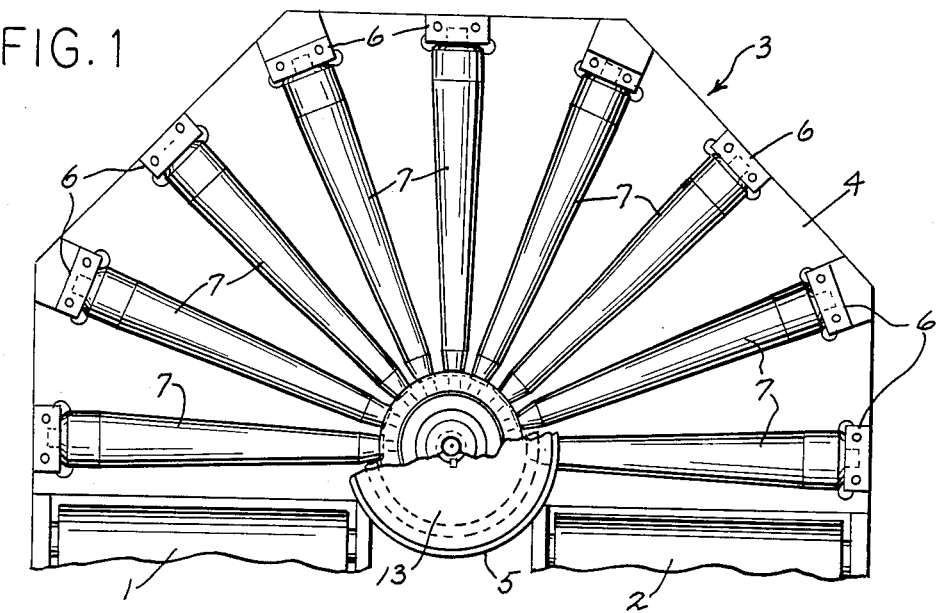
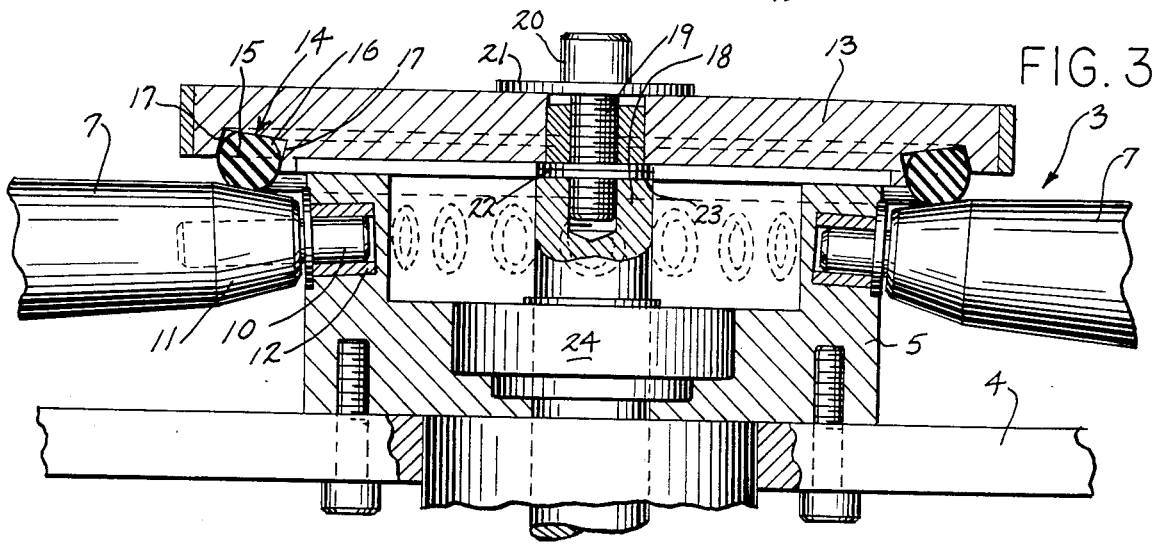
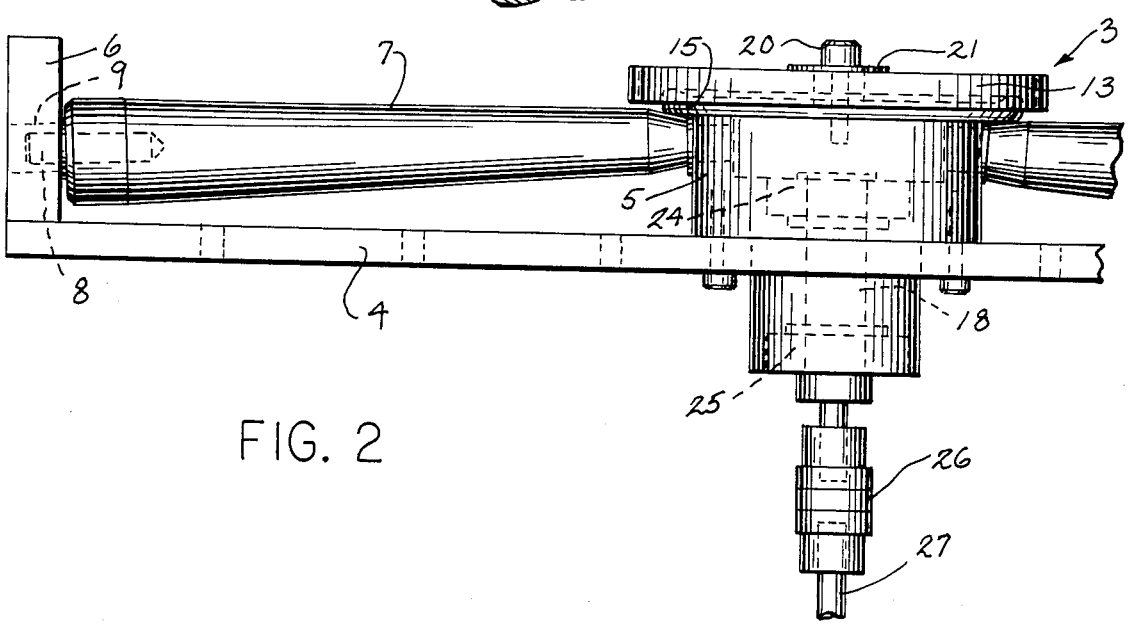

DRIVE MECHANISM FOR A LIVE ROLLER CONVEYOR

BACKGROUND OF THE INVENTION

A curved live roller conveyor consists of a series of rollers which are arranged in a curved path or arc with the axes of the rollers located at an acute angle with respect to each other. The rollers are power driven so that the load supported on the rollers is conveyed by rotation of the rollers.

Problems have arisen in the past in designing an effective drive mechanism for live rollers that are positioned in a curved section of the conveyor. Previous attempts have involved the use of gear trains, chain and sprocket drives, or belt drives to interconnect the rollers in the curved path. However, such drives have been complicated, expensive, and noisy in operation.

As an example, U.S. Pat. No. 4,485,913 shows a drive mechanism for a curved live roller conveyor in which a drive belt is connected to the inner ends of the rollers in the curved path. In this patent the drive belt is mounted on a series of pulleys and the inner end of each roller is engaged with the upper surface of the belt to provide a frictional driving connection between the belt and the rollers.

In U.S. Pat. No. 1,975,927 a belt is frictional engaged with the lower surface of each roller in the curved path, and the belt is mounted to move in a generally curved path beneath the rollers by angularly mounted idler rollers.

In French Pat. No. 1,518,326, a drive belt is mounted for travel in a generally curved path beneath a series of rollers which are biased upwardly out of engagement with the drive belt. The weight of the product on the drive rollers forces the rollers downwardly against the biasing force to bring the rollers into engagement with the belt to thereby provide a driving connection between the belt and the rollers.

In general, the drive systems, as disclosed in the aforementioned patents have included a drive belt that engaged the lower surface of the rollers and the frictional resistance between the belt and the rollers was increased by the weight of the product being conveyed. Conveyors of this type are best suited for heavier products where an increase in weight will provide a corresponding increase in the frictional driving connection.

SUMMARY OF THE INVENTION

The invention is directed to an improved drive for a curved live roller conveyor, and has particular application for conveying small lightweight products. In accordance with the invention, the conveyor includes a plurality of rollers which are arranged in a generally curved path with the axes of the rollers being positioned at an acute angle with respect to each other. A rotatable drive disc is disposed above the adjacent inner ends of the rollers, and a resilient O-ring is mounted within a groove in the lower surface of the drive disc and is disposed in engagement with the inner ends of the rollers. Rotation of the drive disc will act through the O-ring to rotate the rollers about their axes. To regulate the frictional resistance between the O-ring and the rollers, the vertical position of the drive disc relative to the rollers can be adjusted.

The drive system of the invention is particulary adapted for use in conveying small lightweight products and the adjustment of the position of the drive disc enables precise control of the frictional driving force to be obtained.

The O-ring is of standard construction, and if worn, can readily be replaced by merely removing the O-ring from the groove in the drive disc and substituting a new O-ring.

As the O-ring is engaged with the upper surface of the rollers and is located beneath the drive disc, the construction eliminates the possibility of dirt and other foreign material collecting between the O-ring and the rollers.

The drive mechanism of the invention can be utilized with curved conveyor sections that move through an arc up to 180°.

Other objects and advantages will appear in the course of the following description.

DESCRIPTION OF THE DRAWINGS

The drawings illustrate the best mode presently contemplated of carrying out the invention.

In the drawings:

FIG. 1 is a plan view of the conveyor system of the invention;

FIG. 2 is a side elevation of one of the rollers in the conveyor system; and

FIG. 3 is an enlarged fragmentary vertical section showing the driving connection between the drive disc and the roller.

DESCRIPTION OF THE ILLUSTRATED EMBODIMENT

FIG. 1 illustrates a conveyor system having a pair of conventional belt conveyors 1 and 2 which are located generally parallel to each other and are connected by a curved live roller conveyor 3. While shown as belt conveyors, the conveyors 1 and 2 can be any type of conventional conveyor.

As illustrated in FIGS. 1 and 2, live roller conveyor 3 includes a base plate 4 which supports an inner bearing block 5 and a series of outer bearing blocks 6. Rollers 7, which are arranged in a generally curved pattern, are journalled within the bearing blocks 5 and 6. As shown in FIG. 2, rollers 7 are tapered throughout their length and the axis of each roller is inclined upwardly so that the upper supporting surface of each roller lies in a horizontal plane.

The outer surface of each roller can be covered with a plastic covering, such as a polyurethane resin, to dampen the noise of the conveying operation.

To journal the rollers 7, a stub shaft 8 extends outwardly from one end of each roller 7 and is journaled within a bearing assembly 9 mounted in block 6. In addition, a stub shaft 10 extends from the opposite tapered end 11 of each roller 7 and is journaled within a thrust and radial bearing assembly 12 mounted within a recess is bearing block 5.

In accordance with the invention, a generally flat drive disc 13 is mounted above bearing block 5 and the lower surface of drive disc 13 is formed with a circular groove 14 which receives a resilient rubber-like O-ring 15. As shown in FIG. 3, the lower portion of O-ring 15 projects downwardly beneath the surface of the drive disc and is engaged with the tapered end portion 11 of each roller 7.

As best illustrated in FIG. 3, groove 14 is provided with a bottom 16 and a pair of side walls 17 and the bottom 16 is located at an acute angle with respect to the lower surface of drive disc 13 and side walls 17 are located at an acute angle with respect to the axis of the disc. This configuration of the groove 14 aids in maintaining the O-ring in the groove during rotation of drive disc 13.

To drive the disc 13, a vertical shaft 18 extends upwardly through a central opening in bearing block 5. A stud 19 serves to connect the disc 13 to shaft 18, and the head 20 of stud 19 bears against washer 21. One or more shims 22 can be positioned against a shoulder 23 formed on shaft 18 and serve to adjust the vertical position of disc 13 relative to rollers 7. By threading down stud 19, O-ring 15 can be partially compressed to control the frictional resistance between O-ring 15 and the rollers 7.

Shaft 18 is journaled within a pair of bearings 24 and 25 mounted in the bearing block 5, and the lower end of shaft 18 is connected by coupling 26 to the drive shaft 27 of a motor or other power source. This construction, rotation of shaft 27 is transmitted to shaft 18 which, in turn, will rotate drive disc 13 and O-ring 15 to thereby rotate rollers 7 about their axes.

Through the adjustment of the vertical position of the drive disc 13, precise control of the frictional drive force between the O-ring and the rollers 7 can be made.

The O-ring 15 is of standard construction and can readily be removed for replacement. By disengaging stud 19 from the end of shaft 18 and removing the drive disc 13, a replacement O-ring can then be snapped into position in groove 14 and the drive disc reattached to the shaft.

While the drawings have illustrated the conveyor 3 as extending through an arc of 180°, it is contemplated that the conveyor of the invention can be employed to transport articles through any curved path.

Various modes of carrying out the invention are contemplated as being within the scope of the following claims particularly pointing out and distinctly claiming the subject matter which is regarded as the invention.

I claim:

1. A curved live roller conveyor, comprising at least one pair of generally horizontal rotatable rollers disposed at an acute angle with respect to each other, a drive disc disposed above adjacent ends of said rollers, said disc having a lower flat surface and having an annular groove in said lower surface, said groove being concentric with the axis of rotation of said disc, drive means operably connected to said drive disc for rotating said disc, an endless resilient drive member mounted in said groove with the lower portion of said member projecting downwardly from said groove and disposed in engagement with said adjacent ends of said rollers, and adjusting means for adjusting the vertical position of said disc relative to said adjacent ends of said rollers to thereby vary the frictional force between said endless member and said adjacent ends, rotation of said drive disc acting through said drive member to rotate said rollers about their axes.

2. The conveyor of claim 1, wherein said groove is defined by a bottom and a pair of side walls, said bottom being located in a plane at an acute angle to the lower surface of said disc.

3. The conveyor of claim 1, wherein said drive member is an O-ring having a generally circular cross section.

4. A curved live roller conveyor, comprising a plurality of rollers arranged in a generally curved path with the axes of adjacent rollers being disposed at an acute angle with respect to each other, journalling means for journalling each roller for rotation about its axis, a drive disc mounted above adjacent ends of said rollers and having a groove in the lower surface thereof, said groove being concentric with the axis of rotation of said disc, a resilient endless member mounted in the groove and projecting downwardly from said lower surface and disposed in engagement with the adjacent ends of said rollers, the cross sectional configuration of said groove being different from the cross sectional configuration of said endless member to provide a space therebetween, drive means for rotating the disc, and adjusting means for adjusting the vertical position of said disc relative to said adjacent ends of said rollers to thereby vary the frictional force between said endless member and said adjacent ends, rotation of the disc being transmitted through said endless member to said rollers to thereby rotate said rollers about their axes.

5. The conveyor of claim 4, wherein said journaling means comprises a central bearing block disposed beneath the drive disc, said adjacent ends being journaled for rotation in said bearing block, said drive means including a generally vertical shaft operably connected to a power source and extending through an opening in said bearing block.

6. A curved live roller conveyor, comprising a plurality of rollers arranged in a generally curved path with the axes of adjacent rollers disposed at an acute angle with respect to each other, journalling means for journalling each roller for rotation about its axis, a drive disc located above adjacent ends of said rollers and having a generally flat lower surface, said lower surface provided with a generally circular groove, a resilient endless member mounted in said groove and projecting downwardly beneath said lower surface and disposed in engagement with the adjacent ends of said rollers, said journalling means including a central bearing block to journal adjacent inner ends of said rollers, drive means for rotating said disc and including a vertical drive shaft extending upwardly through said bearing block and connected to said disc, and adjusting means for adjusting the vertical position of said disc relative to said rollers to thereby vary the frictional driving force between said endless member and said adjacent ends.

7. The conveyor of claim 6, wherein said groove is bordered by an inner annular surface disposed radially inward of said endless member, said inner surface extending upwardly and inwardly with respect to said lower surface to retain said endless member within said groove.

8. The conveyor of claim 6, wherein said adjusting means comprises a threaded member interconnecting said disc and an end of said drive shaft, threading down of said threaded member acting to compress said O-ring between said disc and said inner ends of said rollers to vary said frictional driving force.

9. The conveyor of claim 6, wherein said groove is defined by a bottom and an inner side wall and an outer side wall, said bottom being located in a plane at an acute angle to said lower surface of said disc and said inner side wall extending upwardly and inwardly with respect to said lower surface.

* * * * *